(12) United States Patent
Stubbs (10) Patent No.: US 11,311,004 B2
(45) Date of Patent: Apr. 26, 2022

(54) COLLAPSIBLE FISH TRAP WITH ACOUSTIC MASKING PROPERTIES

(71) Applicant: Alexander Stubbs, Boulder, CO (US)

(72) Inventor: Alexander Stubbs, Boulder, CO (US)

( * ) Notice: Subject to any disclaimer, the term of this patent is extended or adjusted under 35 U.S.C. 154(b) by 0 days.

(21) Appl. No.: 17/408,395

(22) Filed: Aug. 21, 2021

(65) Prior Publication Data

US 2022/0053744 A1 Feb. 24, 2022

Related U.S. Application Data

(60) Provisional application No. 63/068,901, filed on Aug. 21, 2020.

(51) Int. Cl.
*A01K 69/04* (2006.01)
*A01K 69/06* (2006.01)
*A01K 69/10* (2006.01)

(52) U.S. Cl.
CPC .............. *A01K 69/04* (2013.01); *A01K 69/06* (2013.01); *A01K 69/10* (2013.01)

(58) Field of Classification Search
CPC ......... A01K 69/04; A01K 69/06; A01K 69/10
See application file for complete search history.

(56) References Cited

U.S. PATENT DOCUMENTS

| 2,935,811 A * | 5/1960 | Knut | A01K 69/10 43/105 |
| 4,134,225 A * | 1/1979 | Welch | A01K 69/10 383/119 |
| 2015/0135580 A1* | 5/2015 | Havens | A01K 69/08 43/4.5 |

FOREIGN PATENT DOCUMENTS

| KR | 20110009508 U | * 10/2011 |
| KR | 20130086689 A | * 8/2013 |
| KR | 20160096333 A | * 8/2016 |

OTHER PUBLICATIONS https://www.amazon.com/Drasry-Crawfish-Portable-Collapsible-Accessories (Year: 2021).*
https://www.pond5.com/stock-footage/item/81636553-fish-trap-fishing-net-form-cylinder-hanging-concrete-wall (Year: 2021).*

* cited by examiner

*Primary Examiner* — Richard G Davis
(74) *Attorney, Agent, or Firm* — Synergy Patent Group (57) ABSTRACT

Various aspects of the disclosure generally relate a fish trap for use in waters among marine predators which use echo-location. In one aspect the fish trap has acoustic masking properties. In one aspect the fish trap may be a lightweight, collapsible column for use by small commercial vessels and recreational fishing. In one aspect the fish trap may have an overlapping net, forming a double seam for added strength. In one aspect the fish trap may have reinforcing wire along bridle attachment points to hold heavier loads of fish.

20 Claims, 9 Drawing Sheets

COLLAPSIBLE FISH TRAP WITH ACOUSTIC MASKING PROPERTIES

CROSS-REFERENCE TO RELATED APPLICATIONS

This application claims priority under 35 U.S.C. § 119 to U.S. Provisional Patent Application No. 63/068,901, filed Aug. 21, 2020, entitled Collapsible Fish Trap With Acoustic Masking Properties, which is hereby incorporated by reference in its entirety.

BACKGROUND

Field of the Disclosure

Aspects of the disclosure relate to fishing, and to a fish trap usable in waters subject to predation.

Description of Related Art

Commercial fishing for halibut and sablefish in Alaska is largely fished by smaller boats under 100 feet in length. Historically in southeast Alaska, West Yakutat and the Central Gulf of Alaska, sablefish were fished with both longline hook gear (consisting of thousands of hooks attached to line that lay at the bottom of the ocean—herein referred to as longline) or longline "pot" gear, consisting of large rigid frame fish trap "pots" weighing between 40-200 pounds each (herein referred to as pot or pots). The "pot" terminology comes from the fact that traditional sablefish pots are derived from Alaskan king crab pots. In commercial fishing, "pots" typically refer to large, rigid-framed fish traps. Pots have the advantage of being robust and capable of holding large quantities of fish. They also rely on their robust construction to resist whale depredation on fishing gear. Pots can be used in waters heavy with predators such as whales, as the pots create a rigid metal cage around the catch and are fairly resistant to predation. In order to make it easier for fishing boats to raise pots from deep in the water column without capsizing their vessel or straining their hydraulic systems, pots are made with low surface density, which reduces drag produced when rapidly hauling the pot through the water. One way to achieve low surface density is using the largest possible hole size in the net that prevents fish from escaping, along with thin netting (small diameter netting material).

Fishing sablefish with pots has been practiced in the Alaskan fishery since the early 70 s but due to gear conflicts with longline boats it was phased out in much of Alaska during the late 1980 s. During this period the Canadian commercial fishery fished predominantly with fish pots, largely of the nesting conical design originally modified from tanner or snow crab traps. In Washington, Oregon, and California, fishing sablefish with pots has remained legal and hundreds of small boats participate in that fishery off the West Coast with both pot and longline hook gear. Size and weight constraints dictate that smaller vessels fish with longline hook gear instead of pots.

One current design for a sablefish pot is a large, rigid trapezoidal frame (with a top square of slightly smaller dimensions connected to the larger bottom square by rigid steel) covered in netting. Another design is a rigid conical frame consisting of two metal hoops (one about ⅔ the diameter of the other) connected by welded metal supports. Both of these trap designs are typically made of mild carbon steel and weigh 40-200 pounds depending on the size. In some regions of the US and internationally there have been experiments with collapsible cod traps, notably large, rectangular folding designs that are suspended above the sea floor with floats.

Numerous pots attached to a retrieval line being pulled from the ocean have a cumulative drag requiring large, heavy and powerful equipment to overcome. Sablefish pots typically use twisted nylon or braided PE mesh with a diameter under 3 mm and large mesh size, often 7-10 cm half mesh. This results in netting that is a balance between low surface density (i.e. a net with large holes and thin line) to reduce drag, while also having a small enough mesh size and a strong enough line for catching and retaining commercially valuable fish. Typical net surface density for these pots is 50-70 g/m$^2$. Here the netting is strong enough to prevent fish from escaping but the heavy steel frames are relied upon to resist whale attacks Another type of fish trap, a spring trap, is used for recreational fishing of minnows and shrimp (sometimes called crayfish traps). The spring traps have a frame of plastic-coated iron wire or low tensile strength steel, with twisted monofilament mesh netting. Scaling spring traps to a volume appropriate for commercial fishing does not make these traps suitable for commercial fishing for several reasons. Testing of the scaled-up recreational spring traps shows them to be easily damaged during use, and susceptible to whale predation while fishing.

Small-vessel fishing fleets are unable to utilize pots, and fishing with longline hooks presents several challenges. Depredation by orca or sperm whales can cause significant loss of their catch. Hooks are indiscriminate and catch large amounts of bycatch, including sharks, rays, skates and seabirds. Hooks require laborious hand baiting on small boats which is time consuming for the crew. What is needed is a collapsible, lightweight fish trap usable by smaller fishing boats and suitable for catching commercially valuable fish without being susceptible to predation.

SUMMARY

This disclosure recites a fish trap having a helical spring with a thickness greater than or equal to 6 mm. The fish trap may be configured to have an expanded state, the spring in the expanded state having the approximate shape of a column with a diameter greater than 50 cm and a length greater than 100 cm. A net may be coupled to the spring forming a side wall for the approximately shaped column. A first end wall and a second end wall may be at the two opposite ends of the helical spring, lengthwise, each of the first end wall and the second end wall having a web, the helical spring having an interior defined by the bounds of the net and the web at each of the first and second end walls. The net may have a surface density from 110 grams/meter squared to 350 grams/meter squared. A first hoop in the first end wall may be coupled to the web in the first end wall and may create a first entrance, the first hoop having a diameter less than the diameter of the column, the first hoop configured to allow fish to access the interior of the fish trap. The net may have a half mesh size less than 6 centimeters, be composed of a knotless material and be selected from the group consisting of polyethylene or nylon.

The fish trap may further include a second hoop in the second end wall coupled to the web in the second end wall and creating a second entrance. The second hoop may have a diameter less than the diameter of the column and the second hoop may be configured to allow fish to access the interior of the fish trap. The trap may have a plurality of cords coupled to the first hoop and to the second hoop, the plurality of cords extending in approximately a straight line when the spring is in the expanded state. A mesh may be separately coupled to each of the first hoop and the second hoop, each mesh and hoop combination configured to form a funnel to the interior of the fish trap when the spring is in the expanded state, the plurality of cords coupled between the mesh at each of the first and second hoops and configured to create the funnel at each of the first end wall and second end wall. The net and the web have the same acoustic signature. The door may be configured to allow removal of fish caught in the fish trap. A plurality of escape rings may be positioned on the side wall, the plurality of escape rings each having a diameter less than the diameter of the first hoop. A partial hoop may be coupled to the spring and coupled to the web in the first end wall, the partial hoop and web forming the first end wall and the door, the partial hoop configured to securely attach to the spring in a closed position. When the partial hoop is in the closed position, it may be configured to provide access through the first hoop by fish to the interior, the door configured to swing into an open position and deform the first end wall. The door may be configured to provide greater access to the interior when in the open position than the access provided to the interior by the first hoop. A support line may be coupled to each end of the helical spring, lengthwise, extending from one end of the spring to the other end of the helical spring. A separate support wire may be coupled to the helical spring at each end, the support wires at each end extending along the helical spring for less than half the circumference of the column, the support wires configured to provide strength and rigidity to the helical spring during retrieval of the fish trap. The support line may be coupled to the helical spring on a side opposite the support wires, the support line running in approximately a straight line and further coupled to the helical spring where the support line crosses the helical spring. The net may have an overall width greater than the circumference of the helical spring such that the net overlaps itself along the length of the helical spring by at least one square of netting, forming a double seam. The net may be coupled to itself along each end of the double seam overlap.

The fish trap may be configured to have a collapsed state. The fish trap when in the collapsed state having a cross-sectional area of less than one quarter the cross-sectional area of the fish trap while in the expanded state. The net may be coupled to the helical spring only at the ends of the helical spring, lengthwise, the net and the helical spring free from one another between the first end wall and the second end wall.

A fish trap may include a helical spring with a thickness greater than or equal to 6 mm and be configured to have an expanded state. The spring in the expanded state may have the approximate shape of a column with a diameter greater than 50 cm and a length greater than 100 cm. A net may be coupled to the spring forming a side wall for the approximately shaped column. A first end wall and a second end wall may be formed at the two opposite ends of the helical spring, lengthwise, each of the first end wall and the second end wall having a web. The helical spring may have an interior defined by the bounds of the net and the web at each of the first and second end walls. A first hoop in the first end wall may be coupled to the web in the first end wall and create a first entrance. The first hoop may have a diameter less than the diameter of the column. The first hoop may be configured to allow fish to access the interior of the fish trap. A first support wire may be coupled to the helical spring at the first end wall, the first support wire may extend along the helical spring for less than half the circumference of the column. A second support wire may be coupled to the helical spring at the second end wall. The second support wire may extend along the helical spring for less than half the circumference of the column.

A fish trap may include a helical spring with a thickness greater than or equal to 6 mm, configured to have an expanded state. The spring when in the expanded state may have the approximate shape of a column with a diameter greater than 50 cm and a length greater than 100 cm. A net may be coupled to the spring forming a side wall for the approximately shaped column, a first end wall and a second end wall at the two opposite ends of the helical spring, lengthwise. Each of the first end wall and the second end wall may have a web. The helical spring may have an interior defined by the bounds of the net and the web at each of the first and second end walls. A first hoop in the first end wall may be coupled to the web in the first end wall and may create a first entrance. The first hoop may have a diameter less than the diameter of the column. The first hoop may be configured to allow fish to access the interior of the fish trap. A support line may be coupled to each end of the helical spring, lengthwise, extending from one end of the spring to the other end of the helical spring. The support line may run in approximately a straight line and further coupled to the helical spring where the support line crosses the helical spring.

A fish trap may include a helical spring with a thickness greater than or equal to 6 mm, configured to have an expanded state. When the spring is in the expanded state it may have the approximate shape of a column with a diameter greater than 50 cm and a length greater than 100 cm. A net may be coupled to the spring forming a side wall for the approximately shaped column. The net may have an overall width greater than the circumference of the helical spring such that the net overlaps itself along the length of the helical spring by at least one square of netting. The overlap may form a double seam. The net may be coupled to itself along each end of the overlap. A first end wall and a second end wall may be at the two opposite ends of the helical spring, lengthwise, each of the first end wall and the second end wall having a web. The helical spring may have an interior defined by the bounds of the net and the web at each of the first and second end walls. A first hoop in the first end wall may be coupled to the web in the first end wall and may create a first entrance. The first hoop may have a diameter less than the diameter of the column. The first hoop may be configured to allow fish to access the interior of the fish trap.

A fish trap may include a helical spring with a thickness greater than or equal to 6 mm, configured to have an expanded state and a collapsed state. The spring when in the expanded state may have the approximate shape of a column with a diameter greater than 50 cm and a length greater than 100 cm. The fish trap when in the collapsed state having a cross-sectional area of less than one quarter the cross-sectional area of the fish trap while in the expanded state. A net may be coupled to the spring forming a side wall for the approximately shaped column, a first end wall and a second end wall at the two opposite ends of the helical spring, lengthwise. Each of the first end wall and the second end wall may have a web. The helical spring may have an interior defined by the bounds of the net and the web at each of the first and second end walls. A first hoop in the first end wall may be coupled to the web in the first end wall and may create a first entrance. The first hoop may have a diameter less than the diameter of the column. The first hoop may be configured to allow fish to access the interior of the fish trap.

The foregoing has outlined rather broadly the gestures and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of this disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully herein with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure may be embodied by one or more elements of a claim.

Figure 1:
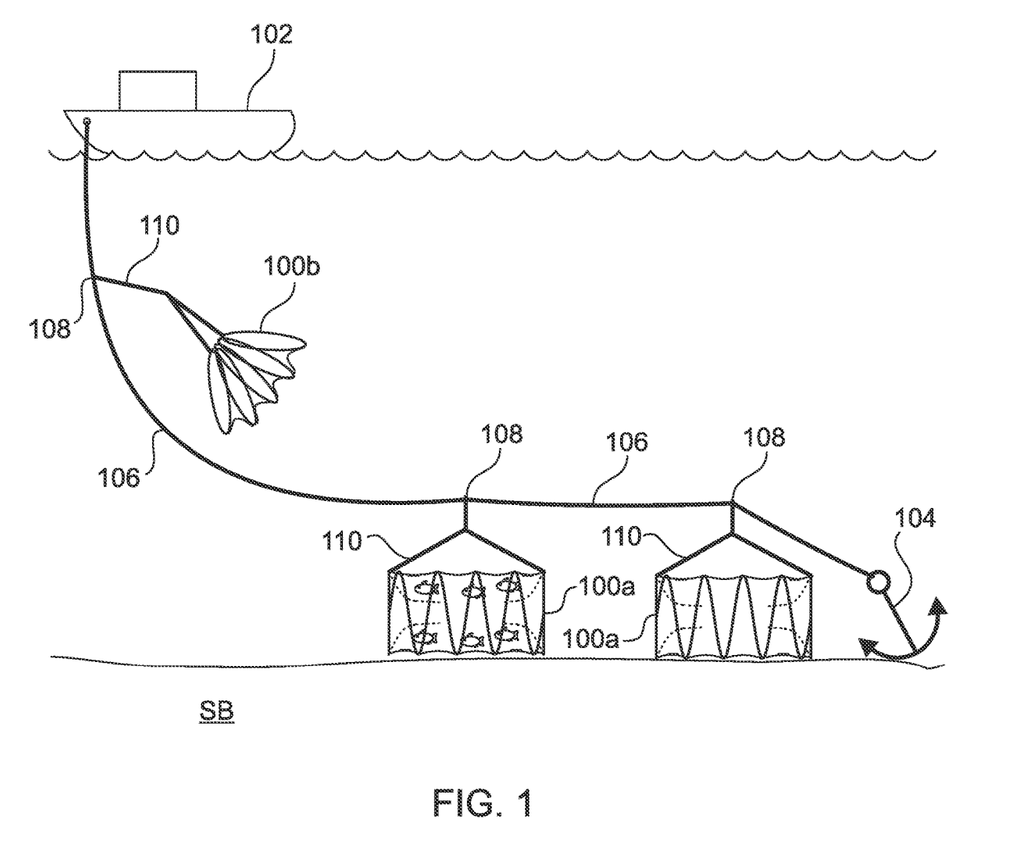
FIG. 1 is an environmental perspective view of fish traps being used in commercial fishing.

FIG. 1 is an environmental perspective view of fish traps being used in commercial fishing, designated generally with reference numeral 100 in the figures. Fish trap 100a is illustrated in an expanded state and fish trap 100b is in a partially collapsed state (collectively referred to as fish trap or fish traps 100). While reference is made throughout this disclosure to commercial fishing and aspects of commercial fishing, this disclosure applies equally to recreational fishing and subsistence hunting. Fish trap 100 may be used to trap a variety of fish with commercial or food value, for example Pacific cod, Atlantic cod, Greenland turbot, Pacific halibut, Patagonian toothfish (Chilean seabass, New Zealand ling, ling cod and sablefish.

In one aspect, fish traps 100 may be stored in a collapsed state (not shown in FIG. 1, see FIG. 3) on board fishing boat 102. Alternatively, fish traps 100 may be stored in any position between collapsed and expanded, as preferred by the fishermen. For deployment, anchor 104 attached to retrieval line 106 is released from boat 102. Attachment points 108 to retrieval line 106 may be any means of attachment, for example a butterfly knot (lineman's loop). Connecting to attachment point 108 is bridle 110, which may connect to attachment point 108 with, for example, a carabiner (not shown). Bridle 110 attaches to both ends of fish trap 100 by an appropriate means, for example a suitable knot or carabiner. As retrieval line 106 spools out from boat 102, traps 100 enter the water and come to rest on the ocean seabed (SB) in expanded state fish traps 100a. Depending on the type of fishing, bait may or may not be used in traps 100.

The presence of large quantities of fish attracts both human and marine hunters. Schools of fish may be hunted by a variety of whales and other predators. One such predator, the orca whale or killer whale, locates and hunts using echolocation, which may also be used by other marine animals for hunting. By producing a series of high-frequency sound waves and listening for the echo, orcas may determine the size, shape, structure, composition, speed, and direction of a fish or schools of fish. In the case of traditional longline fishing the whales are able to pick off individual fish from the longline, sometimes consuming nearly an entire catch. An orca may grow up to eight meters in length and weigh up to six tons, making them formidable creatures. Sperm whales can grow to 16 meters and 40 tons and are also a primary predator on the sablefish fishery off the Alaskan coast. Evidence shows that both sperm whales and orcas try to access traditional rigid pot traps (pots) filled with fish, but are generally unsuccessful because the pots have a strong steel frame that prevents the whales from destroying the pots and accessing the catch. In contrast, fish traps 100 may have a light-weight bendable frame that allows for partially collapsed and collapsed states, making them manageable for small boats and their crews. Rather than a strong steel frame to protect the catch, fish traps 100 acoustically mask their contents (fish). Fish traps 100 may be filled with fish, for example cod or sablefish, while whale pods swim within meters of boat 102 and the whales make no attempt to interfere with fish traps 100 or obtain the fish. Further aspects of fish traps 100 are discussed below.

When retrieving fish traps 100, boat 102 may pull from the water retrieval line 106. As line 106 comes taut at attachment point 108, bridle 110 pulls on opposite ends of fish traps 100. The effective surface area of fish traps 100 is governed in part by material composition and in part by cross-sectional area, and this bears a relationship to the amount of drag presented by each fish trap 100 through the water. As bridle 110 pulls on the ends of fish trap 100, the result is partially collapsed fish trap 100b. Partially collapsed fish trap 100b has a lower drag than it would as expanded fish trap 100a, allowing for more fish traps 100 to be handled by a given strength of retrieval line 106, a winch (not shown) on boat 102, and increasing the number of fish traps manageable by a given size of boat. Partially collapsed fish trap 100b may be empty, filled with fish, or anywhere in between. Once partially collapsed fish trap 100b reaches boat 102, the crew may disconnect fish trap 100 from retrieval line 106 at attachment point 108 and remove any fish. In recreational fishing, a bridle may not be used and a fisherman's line may be attached to an end of fish trap 100. In this aspect, fish trap 100 may not partially collapse. Recreational fishing may involve one trap at a time, so the cumulative drag of multiple traps is not as much of an issue.

Figure 2:
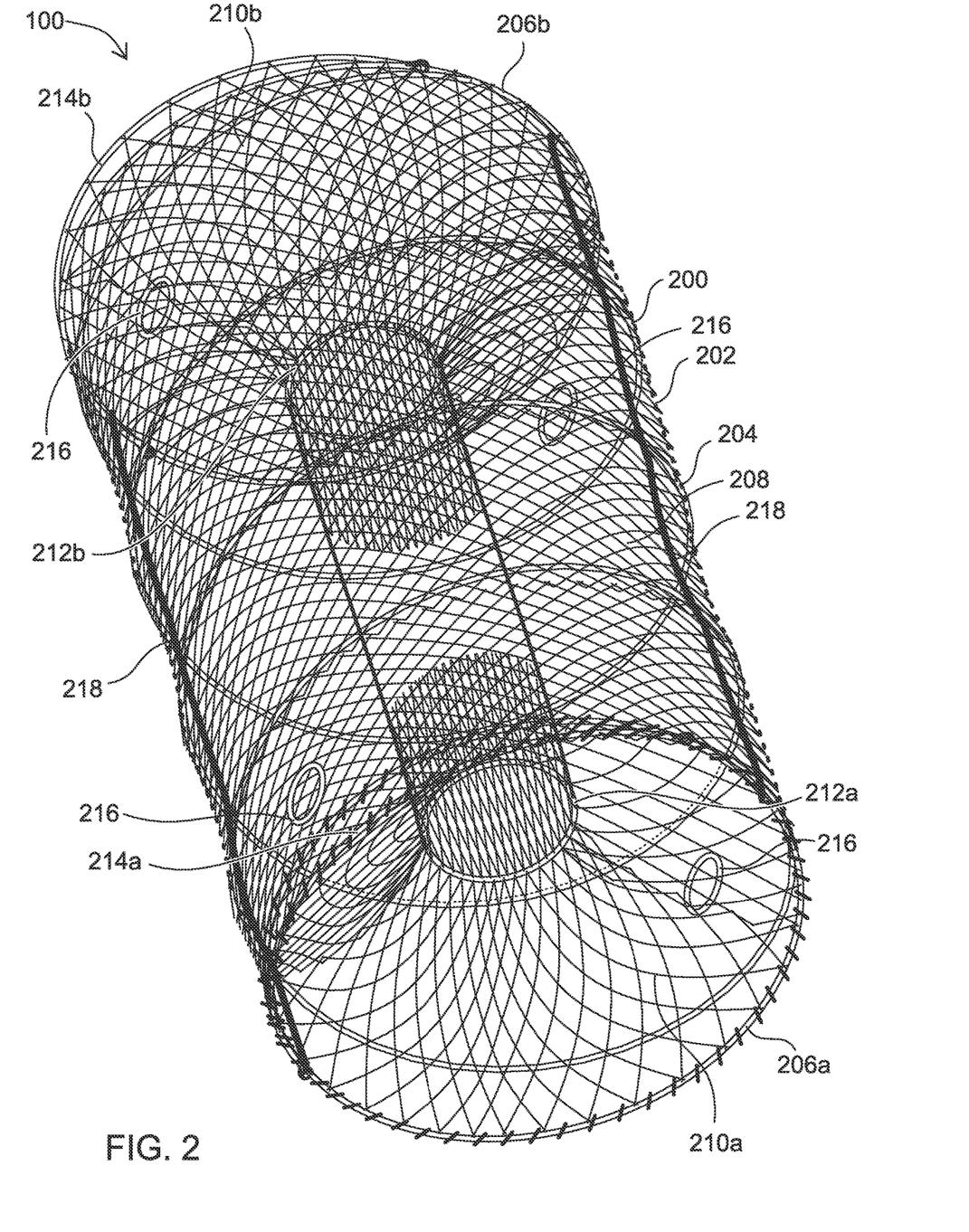
FIG. 2 is a perspective view of one fish trap from FIG. 1 in an expanded state.

FIG. 2 is a perspective view of fish trap 100 from FIG. 1. Helical spring 200 is a frame around which net 202 is wrapped. Spring 200 may be made of galvanized wire with a carbon content from 0.6% to 0.85% and having a thickness greater than or equal to 6 mm, or greater than or equal to 7 mm, or greater than or equal to 8 mm, for example. Spring 200 may be coated with zinc aluminum alloy, which may help prevent oxidation from seawater. The tensile strength of spring 200 may be between 900 and 1300 MPa, balancing rigidity/durability with spring collapsibility. Spring 200 may also be made from other materials, and have other thicknesses, to the extent it retains a bendable and collapsible quality. Spring 200 may hold fish trap 100 in an expanded state absent constraints or outside force (e.g. drag in water), in an approximately column-like shape. In one aspect, the diameter of spring 200 (and correspondingly fish trap 100) may be greater than 50 cm with a length greater than 100 cm. In one aspect, the length may be 150-155 cm. In one aspect, the diameter may be 75-85 cm. In one aspect, the diameter may be approximately 81 cm.

Net 202 forms sidewall 204 of the column and may be wrapped or secured at the two ends of spring 200. End wall 206a and end wall 206b (collectively referred to as end walls 206) are at opposite ends of spring 200 and lead to interior 208 of fish trap 100. In one aspect, net 202 is secured, wrapped, or otherwise attached at each end of spring 200 (at end walls 206), and left free of spring 200 in between. Net 202 may be outside of spring 200 and thus held to the column-like shape by spring 200. One benefit of an absence of attachment points between end walls 206 with respect to net 202 and spring 200 is that during trap deployment, retrieval line 106 (see FIG. 1) can undesirably wrap around fish trap 100, entangling it. Net 202 that is free to slide along spring 200 does so without damage to fish trap 100. When fish trap 100 is retrieved the tangle can be resolved without damage. In one aspect, net 202 may be intermittently attached to spring 200 in between end walls 206, for example by clips, wires, ties, or spring 200 may be woven into net 202. In one aspect, net 202 may be fully attached to spring 200 by clips, wires, ties or spring 200 may be woven into net 202. One benefit of attaching net 202 to spring 200 is reducing the surface over which caught fish will be supported by net 202.

Net 202 may be knotted or knotless, and may be made from polyethylene, ultra-high molecular weight polyethylene (UHMWPE), or nylon, for example. Net 202 has a surface density from 110 grams/meter$^2$ (g/m$^2$) to 385 g/m$^2$, or from 110 g/m$^2$ to 350 g/m$^2$. Surface density may be measured by weighing a square meter of net, for example. Net 202 has a higher surface density than both recreational (10-50 g/m$^2$) and commercial (50-70 g/m$^2$) fishing nets. The increase in surface density increases net strength, which is unnecessary for containing fish, for example cod or sablefish, because commercial fishing nets are already strong enough to hold the fish for which they are intended. Greater surface density increases drag during retrieval. Although stronger, there is no expectation that the increased net strength (by increased surface density) could resist whale attack and that problem has been addressed by the commercial fishing industry with rigid steel-framed pots. Sonar and echolocation used by toothed whales, for example orcas and sperm whales, relies on density differences between seawater and the object they are trying to sense. These density differences impact the speed of sound and cause part of the acoustic signal to reflect off of a particular object. In many fish with gas-filled swim bladders (such as pacific cod or rockfish) this density difference is extreme and the gas-filled swim bladders create a large acoustic signature. Other fish such as halibut, Greenland turbot, sablefish, ling cod or Patagonian toothfish lack a swim bladder and therefore whales are able to get less of an acoustic signature. In the northern Pacific Ocean the fish most impacted by whale depredation are sablefish, Greenland turbot and halibut. These species lack swim bladders and therefore produce a smaller acoustic "echo" than species with swim bladders. Due to the density difference between the netting and seawater using netting with higher surface density than is necessary for fish containment alone can hide the fish contained within from predatory toothed whales. Here, the higher mass of net per square meter provides an acoustic shield, or mask, of fish that may be within fish trap 100. Observation of whales during retrieval of fish traps 100 has indicated that the whales have no interest in fish traps 100. Increased surface density is achieved, in one example with the material and net formation (e.g. knotted vs knotless) being held constant, by either increasing the thickness of the material, or decreasing the size of the holes (mesh), or a combination of the two.

Net size may be measured by half or full mesh measurements, knot-to-knot. A half mesh knot-to-knot (HMKK) measurement would be from one knot (or intersection in the case of knotless netting), to the next nearest knot (or intersection). Typical commercial nets used for sablefish and cod may have 6-10 cm HMKK. In one aspect, net 202 has HMKK of 5 cm or less. Decreasing HMKK (thus decreasing the size of the "holes" in net 202) increases surface density, as would increasing the thickness of net 202. Knotless nets may also have increased surface density as compared to traditional knotted material. In one aspect, braided PE material may be used for net 202 with a sufficiently small HMKK and sufficiently thick lines. Given that commercial fishing nets for cod and sablefish are sufficiently strong having a surface density of 50-70 g/m$^2$, further increasing their surface density runs counter to the need for decreased drag while retrieving pots. The collapsible nature of fish traps 100 allows a larger surface density of netting to be used to acoustically mask the fish within from whale predators without causing extreme drag while the fish traps 100 are retrieved. In one aspect, spring 200 contributes to the acoustical masking of fish within fish traps 100. Spring 200 may hide the acoustic signature of fish, or it may contribute to confusion in identifying the contents of fish traps 100.

In one aspect, surface density in g/m$^2$ is greater than $\frac{1}{5}^{th}$ the internal volume of fish trap 100 as measured in liters.

End walls 206a and end wall 206b have, respectively, web 210a and web 210b (collectively referred to as web 210). Web 210 may be made from the same material in the same way as net 202 and have the same surface density. In one aspect web 210 has a different surface density than net 202, or web 210 may have the same surface density but be made differently or from a different material. Each of web 210*a* and 210*b* connects to hoop 212*a* and hoop 212*b* (collectively referred to as hoops 212). Hoops 212 provide an entrance to fish trap 100 into which fish may swim and be caught inside interior 208. Hoops 212 may be any size smaller than the diameter of fish trap 100 itself. In one aspect, hoops 212 may be 20-25 cm and be formed from a 3 mm 304 stainless steel ring. In one aspect, hoops 212 may be adjustable and formed with a flexible line, for example rope. In one aspect hoops 212 may be circular, or oval in shape depending on the desired fish type. The size of hoops 212 is based on the size of desired fish and determined by local customs and fishermen's experiences.

Each of end walls 206*a* and 206*b* includes doors 214*a* and 214*b*, respectively (collectively referred to as doors 214). Door 214*b* is not illustrated in FIG. 2 for the sake of clarity (another view is provided in FIG. 7). Doors 214 provide access to interior 208. Doors 214 may be mirror images of each other on opposite sides, or they may differ from one another. Doors 214 may be partially circular or hoop-like in shape and attached to spring 200 such that they swing away from end walls 206. Doors 214 may be the same material as spring 200. Doors 214 may be 7 mm spring steel, for example. Door 214*b*, for example, may be semi-permanently secured with cotton, per local regulations or custom, to prevent ghost fishing. In the case that fish trap 100 is lost at sea, eventually the cotton degrades and door 214*b* opens. Fish entering the lost trap can then escape, preventing the trap from continuing to catch fish.

Door 214*a* may be a dump door, for example, secured to spring 200 while fishing and releasable by fisherman to remove fish once fish trap 100 is raised from the sea. Web 210*a* is secured in part directly to spring 200, and on the opposite side to door 214*a*. When door 214*a* is "closed" and secured to spring 200, end wall 206*a* is formed by web 210*a* attached to hoop 212*a*, spring 200 and door 214*a*. Door 214*a* may be secured by a clip, wire, carabiner, rope, or any other mechanism. Fish trap 100 is configured for fishing when door 214*a* is closed. When door 214*b* is "open" and not secured to spring 200, end wall 206*a* collapses and interior 208 can be accessed, for example when fisherman unload the catch. A similar configuration may apply to door 214*b*.

Escape rings 216 in sidewall 204 allow fish that are small enough to escape from fish trap 100. Escape rings 216 may be approximately 9 cm, and may be adjustable. The number of escape rings 216 may be dictated by custom, or local regulations, as well as their size and placement. Escape rings 216 will have a diameter less than that of hoops 212.

Support line 218 may be tied from end wall 206*a* to end wall 206*b* (from one end of spring 200 to the other end). While fish trap 100 is in an expanded state, support line 218 is relatively straight. Where support line 218 crosses a part of spring 200, it may be tied to spring 200 at that point. More than one support line 218 may be used, for example two, three, four, etc. In one aspect, support line 218 may be predominantly outside fish trap 100 (except for the points it ties into spring 200). In one aspect, support line 218 may be interwoven with net 202. In one aspect, support line 218 may be inside fish trap 100, within interior 208. Multiple support lines 218 may be spaced evenly from one another, or they may be spaced to provide greater support where a load of fish is anticipated to rest.

Not specifically illustrated in FIG. 2, a 7 mm line may be wrapped around the end "circles" of spring 200 to provide abrasion resistance and improve durability.

Figure 3:
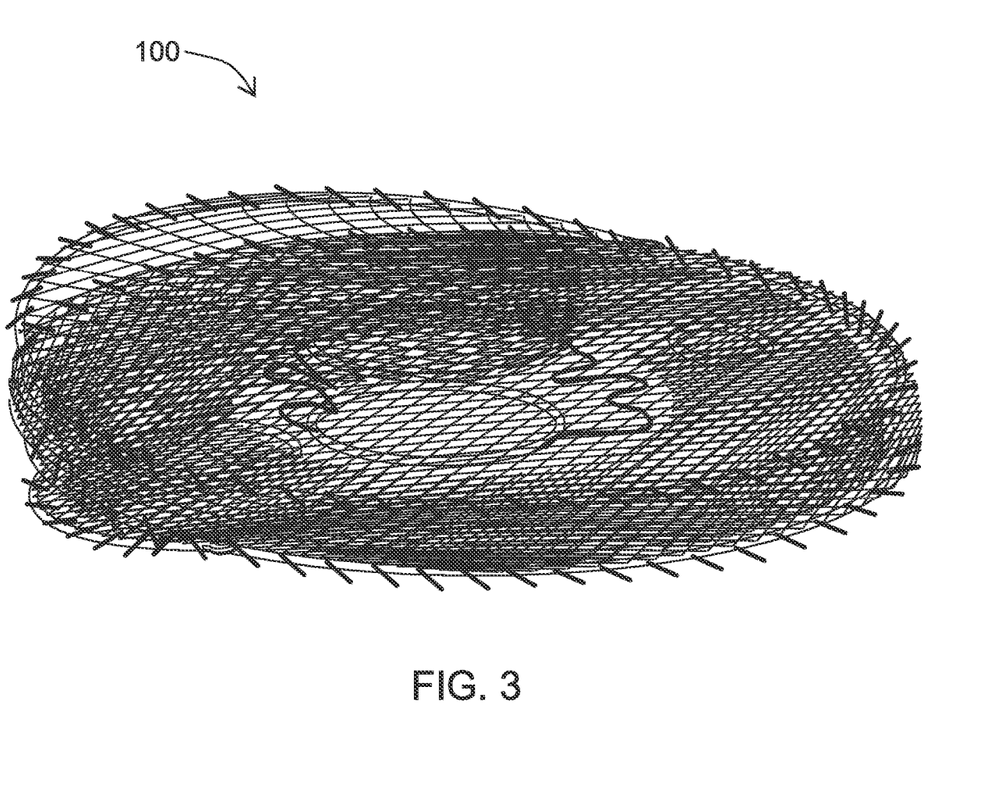
FIG. 3 is a perspective view of one fish trap from FIG. 1 in a collapsed state.

FIG. 3 is a perspective view of fish trap 100 in a collapsed state. Fish trap 100 may be collapsed to one quarter, one third, one fifth, or some other fractional amount of its expanded state. Clips (not shown) may be attached on the sides to keep fish trap 100 collapsed. The collapsed state is useful for transport and storage. Collapsed state differs from partially collapsed state fish trap 100*b* in FIG. 1 as evidenced by FIGS. 1 and 3.

Figure 4:
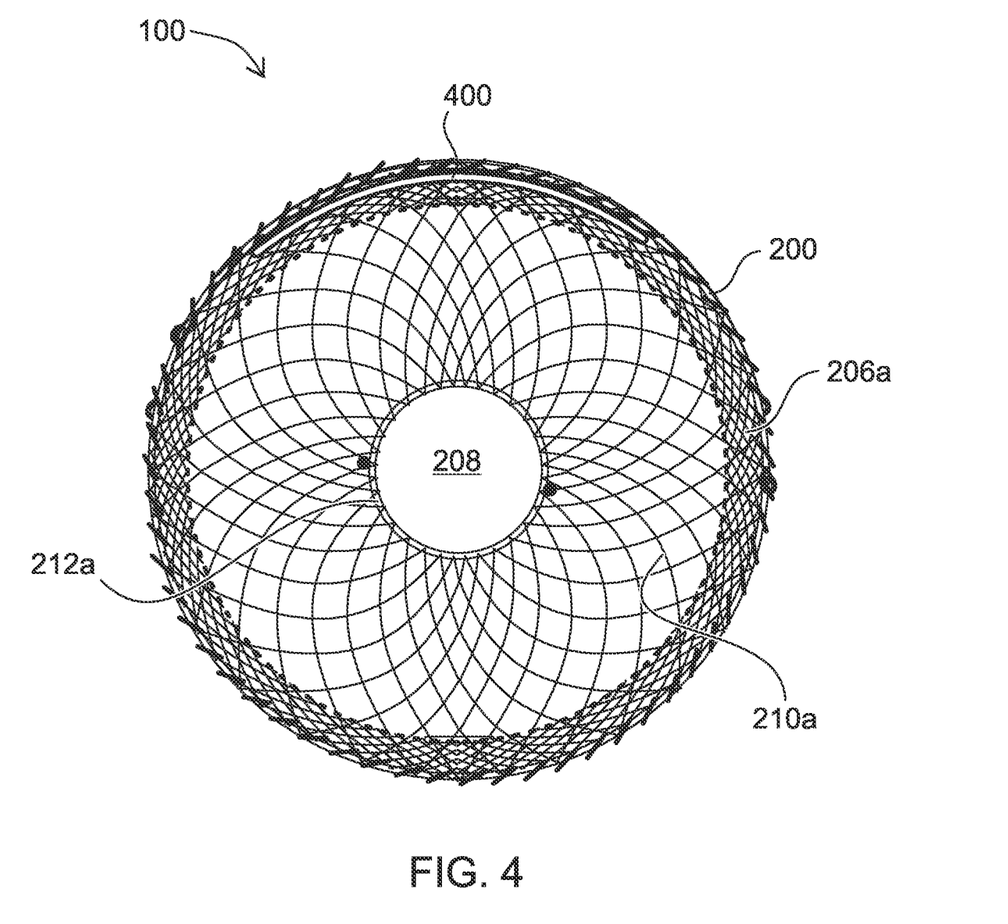
FIG. 4 is a plan view of an end wall of a fish trap.

FIG. 4 is a plan view of end wall 206*a* of fish trap 100. Spring 200 forms the frame with web 210*a* leading to hoop 212*a*, leading to interior 208. Because FIG. 4 is a plan view, fish trap 100 can be viewed through to the opposite side (to end wall 206*b*, not referenced in FIG. 4) and the other entrance for fish. Support wire 400 is a reinforcing member attached to the end of spring 200. Support wire 400 may be at both ends of fish trap 100. Although FIG. 4 is a plan view illustrating one end (end wall 206*a*), either or both ends of spring 200 may have support wire 400. In one aspect, support wire 400 is 7 mm galvanized steel. Not illustrated in FIG. 4, support line 218 may be positioned opposite support wire 400, running roughly perpendicular in direction (see FIG. 2 for lay of support lines 218). In one aspect, two support lines 218 may be positioned across from support wire 400, for example if support wire 400 is at a 12 o'clock position as illustrated in FIG. 4, then one support lines 218 may be positioned at 8 o'clock and another at 4 o'clock, or 5 o'clock and 7 o'clock, for example. In one aspect, three support lines 218 may be evenly spaced from one another, with one support line 218 at 6 o'clock, one support line 218 at 10 o'clock, and one support line 218 at 2 o'clock. Number, location and spacing of support line(s) 218 may be dictated by need.

Figure 5:
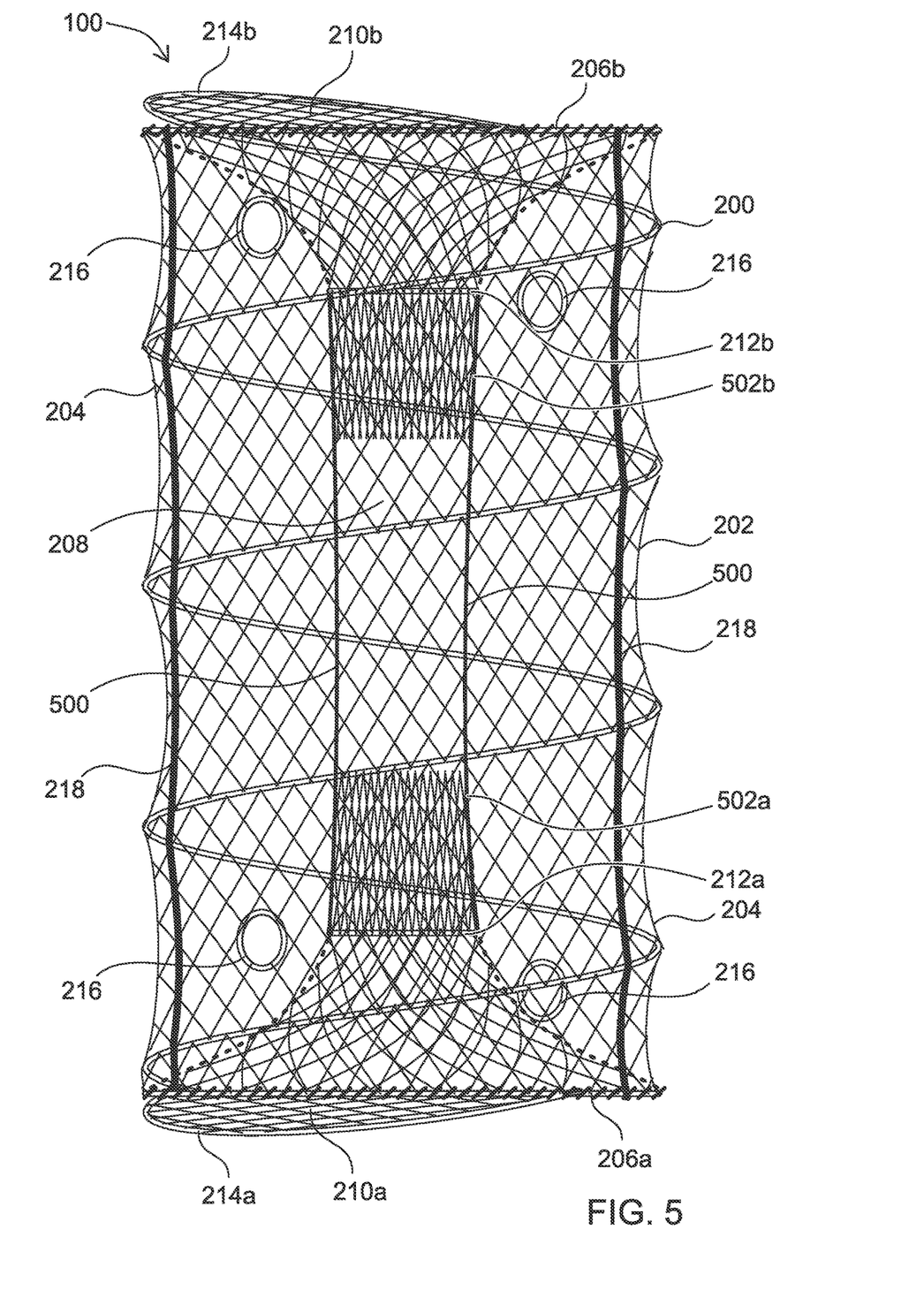
FIG. 5 is a side plan view of a fish trap.

FIG. 5 is a side plan view of fish trap 100. Helical spring 200 forms a frame around which net 202 is wrapped, creating a column-like shape. Net 202 forms sidewall 204 of the column. End walls 206*a* and 206*b* may be funnels at each end of the column, formed by web 210*a* and 210*b*, respectively. Web 210*a* is attached in part to spring 200 and in part to door 214*a*. Door 214*a* is unsecured and slightly open in FIG. 5. Web 210*a* may form a funnel leading to hoop 212*a*. Web 210*b* is attached in part to spring 200 and in part to door 214*b*. Door 214*b* is unsecured and slightly open in FIG. 5. Web 210*b* may form a funnel leading to hoop 212*b*.

Attached between hoops 212 is cord 500. Cord 500 holds hoops 212 within a certain distance from each other such that web 210 is pulled into the funnel shape helping to guide fish towards interior 208 of fish trap 100. Attached to hoop 212*a* is mesh 502*a*. Attached to hoop 212*b* is mesh 502*b*. Mesh 502*a* and 502*b* (collectively referred to as mesh 502) form the end of the funnel from end walls 206 to interior 208. Mesh 502 may be finer or have a lower surface density than net 202. Fish are guided by the funnel into fish trap 100 and caught. Escape rings 216 allow some fish to escape, for example immature or unwanted catch. Support lines 218 may provide strength to fish trap 100.

Figure 6:
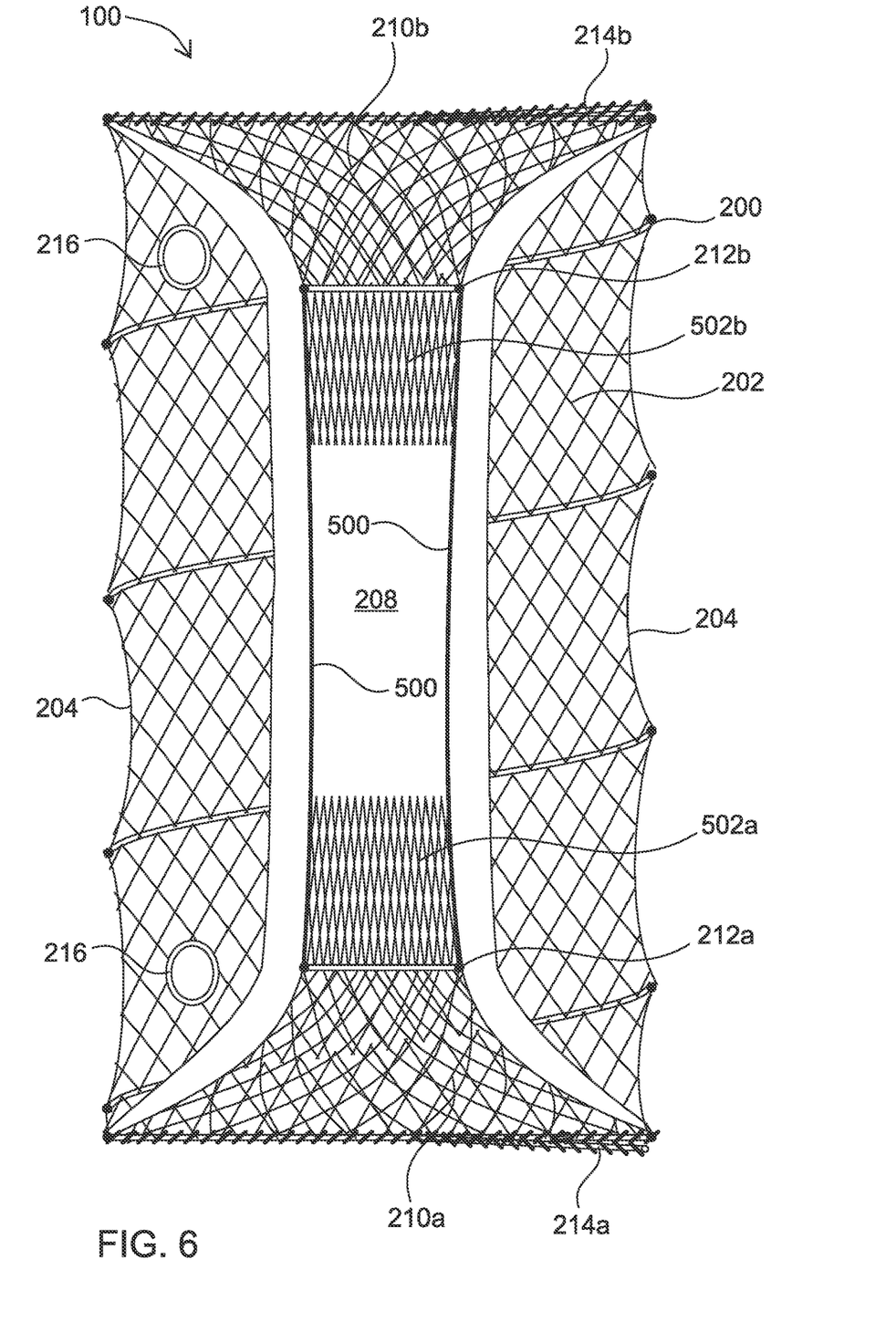
FIG. 6 is a cut-away side plan view of a fish trap, removing two layers of netting in order to provide detail on the inner netting.

FIG. 6 is a cut-away side plan view of fish trap 100, removing from view two layers of net 202 and spring 200 in order to illustrate more clearly interior 208. Helical spring 200 forms a frame around which net 202 is wrapped, creating a column-like shape. Net 202 forms sidewall 204 of the column. Web 210*a* is attached in part to spring 200 and in part to door 214*a*. Door 214*a* is closed in FIG. 6. Web 210*a* may form a funnel leading to hoop 212*a*. Web 210*b* is attached in part to spring 200 and in part to door 214b. Door 214b is closed in FIG. 6. Web 210b may form a funnel leading to hoop 212b.

Attached between hoops 212 is cord 500. Cord 500 holds hoops 212 within a certain distance from each other such that web 210 is pulled into the funnel shape helping to guide fish towards interior 208 of fish trap 100. Attached to hoop 212a is mesh 502a. Attached to hoop 212b is mesh 502b. Mesh 502a and 502b form the end of the funnel to interior 208. Fish are guided by the funnel into fish trap 100 and caught.

Figure 7:
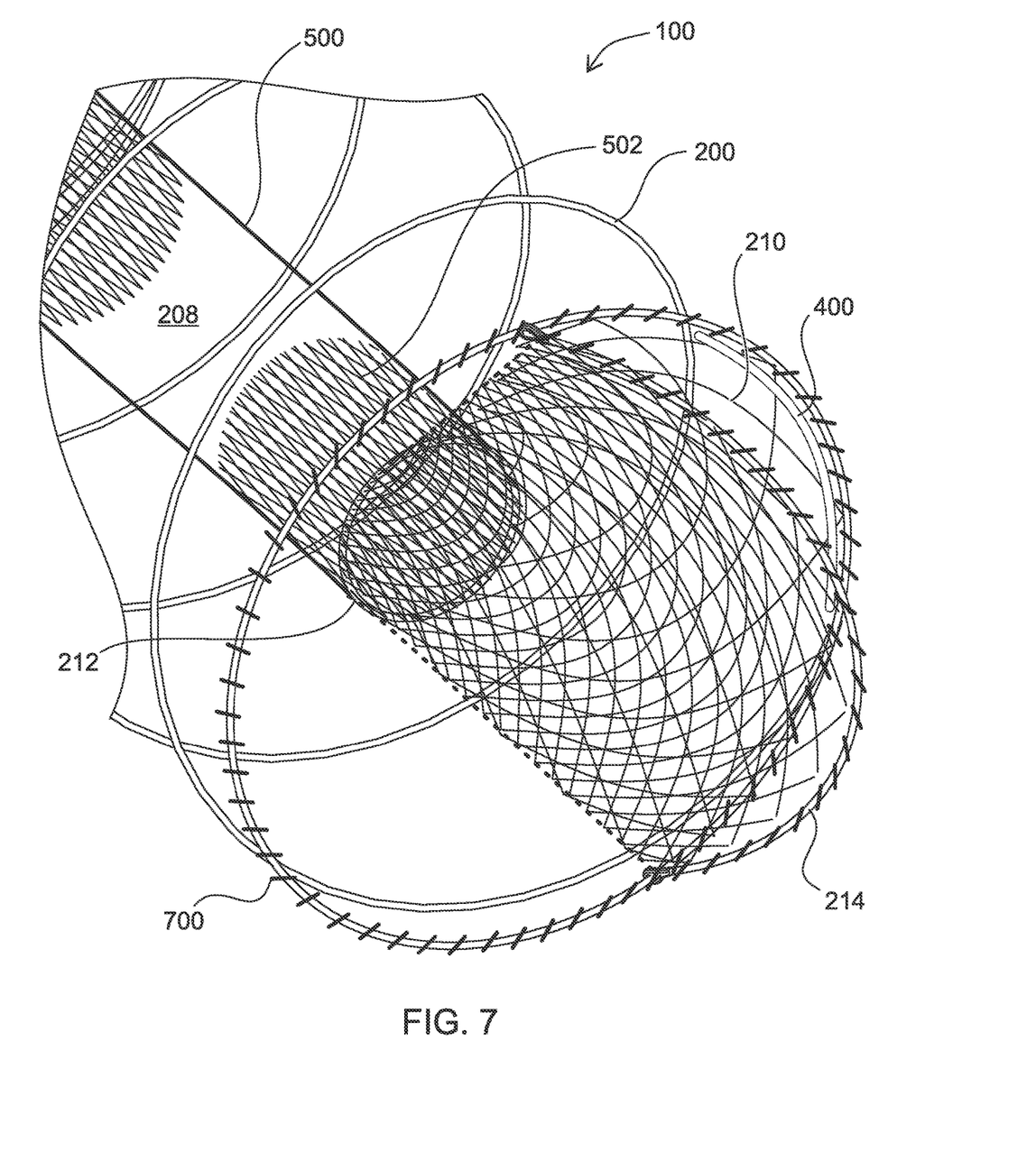
FIG. 7 is a partial perspective view of a fish trap with an open door.

FIG. 7 is a partial perspective view of fish trap 100 with door 214 in an open position. Physical structure and aspects of fish trap 100 are not illustrated in FIG. 7 in order to more clearly focus on door 214. Net 202 is not shown in FIG. 7, however in some aspects net 202 and web 210 may be a single, connected piece of netting. In one aspect, net 202 and web 210 are separate, but both tied to spring 200 at the end, opposite from door 214. In one aspect, abrasion line 700 is wrapped around an end of spring 200 for protection from abrasion.

When door 214 is unsecured it may open to allow access to interior 208. As door 214 opens, web 210 is no longer held in a funnel shape and the funnel collapses toward the side of fish trap 100. Support wire 400 may be opposite doors 214. Bridle 110 may be connected to fish trap 100 at support wire 400, so that as bridle 110 is lifted into the air above boat 102 (and lifts fish trap 100), doors 214 are at the bottom and once open ease the removal of catch.

Figure 8:
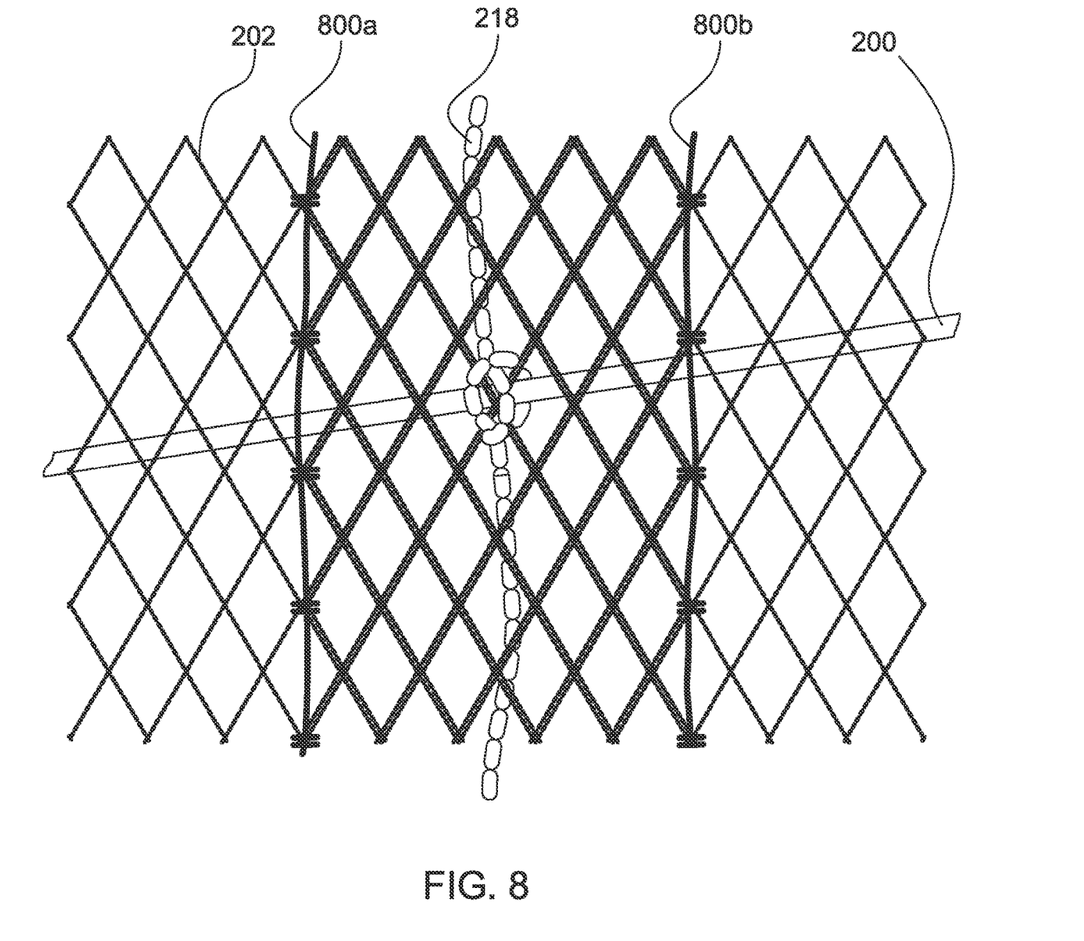
FIG. 8 is a partial perspective view of a net illustrating a double seam.

FIG. 8 is a partial perspective view of net 202 illustrating a double seam. Net 202 may wrap around spring 200 with an overlap of one or more mesh holes where net 202 comes back together. FIG. 8 illustrates an overlap of five mesh holes, but fewer or more mesh holes could be overlapped. Net line 800a secures net 202 to itself at one end of the double seam and net line 800b (net line 800a and net line 800b collectively referred to as net lines 800) ties net 202 to itself at the other end of the double seam. Also pictured is support line 218, to which net lines 800 and the double seam run roughly parallel. Although net lines 800 are illustrated, other means of securing mesh holes to each other may be used, for example clips, wires, ties, staples, etc.

Figure 9:
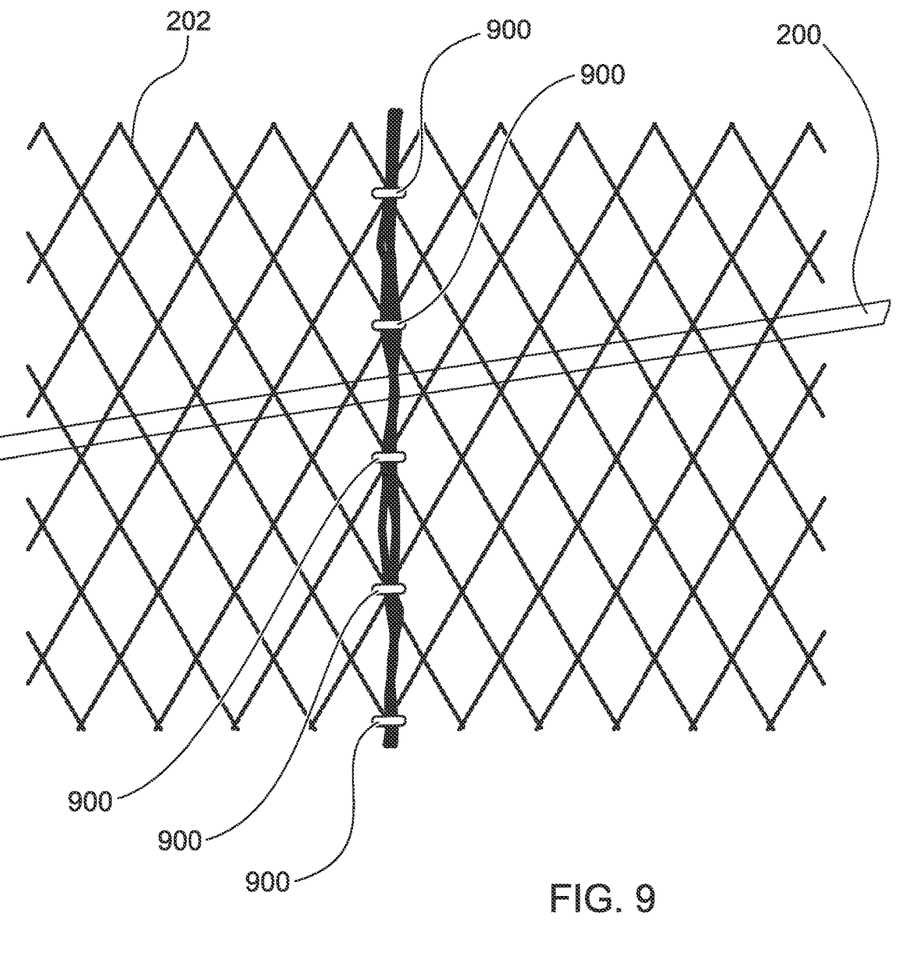
FIG. 9 is a partial perspective view of a net illustrating a single seam.

FIG. 9 is a partial perspective view of net 202 illustrating a single seam. Net 202 may wrap around spring 200 without an overlap and a single seam where net 202 comes back together. Net 202 may be secured with rings 900. Although rings 900 are illustrated, other means of securing net 202 to itself may be used, for example clips, wires, ties, staples, a line, etc.

While commercial fishing is mentioned throughout this description, one of skill in the art will recognize that fish traps 100 are equally applicable and useful for recreational fishing and hunting. Nothing in this description should be taken as limiting in how fish traps 100 are used, other than that they provide a means of fishing among predators which have echolocation, and saving on weight, size and cost of gear.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for something" may be implemented as a "means configured to or suited for something", such as a device or a circuit configured to or suited for the respective task.

It is to be understood that the disclosure of multiple acts, processes, operations, steps, or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include features of a claim to any other independent claim even if this claim is not directly made dependent on the independent claim.

The invention claimed is:

1. A fish trap comprising:
    a helical spring with a thickness greater than or equal to 6 mm, configured to have an expanded state, the spring in the expanded state having the approximate shape of a column with a diameter greater than 50 cm and a length greater than 100 cm;
    a net coupled to the spring forming a side wall for the approximately shaped column, a first end wall and a second end wall at the two opposite ends of the helical spring, lengthwise, each of the first end wall and the second end wall having a web, the helical spring having an interior defined by the bounds of the net and the web at each of the first and second end walls, the net having a surface density from 110 grams/meter squared to 350 grams/meter squared; and
    a first hoop in the first end wall coupled to the web in the first end wall and creating a first entrance, the first hoop having a diameter less than the diameter of the column, the first hoop configured to allow fish to access the interior of the fish trap.

2. The fish trap of claim 1, the net having a half mesh size less than 6 centimeters.

3. The fish trap of claim 1, the net comprising a knotless material.

4. The fish trap of claim 1, the net being a material selected from the group consisting of polyethylene or nylon.

5. The fish trap of claim 1, further comprising:
    a second hoop in the second end wall coupled to the web in the second end wall and creating a second entrance, the second hoop having a diameter less than the diameter of the column, the second hoop configured to allow fish to access the interior of the fish trap.

6. The fish trap of claim 5, further comprising:
a plurality of cords coupled to the first hoop and to the second hoop, the plurality of cords extending in approximately a straight line when the spring is in the expanded state.

7. The fish trap of claim 6, further comprising:
a mesh separately coupled to each of the first hoop and the second hoop, each mesh and hoop combination configured to form a funnel to the interior of the fish trap when the spring is in the expanded state, the plurality of cords coupled between the mesh at each of the first and second hoops and configured to create the funnel at each of the first end wall and second end wall.

8. The fish trap the claim 5 wherein the net and the web have the same acoustic signature.

9. The fish trap of claim 1, further comprising:
a door configured to allow removal of fish caught in the fish trap.

10. The fish trap of claim 9, further comprising:
a plurality of escape rings positioned on the side wall, the plurality of escape rings each having a diameter less than the diameter of the first hoop.

11. The fish trap of claim 10, the door further comprising:
a partial hoop coupled to the spring and coupled to the web in the first end wall, the partial hoop and web forming the first end wall and the door, the partial hoop configured to securely attach to the spring in a closed position, and when in the closed position configured to provide access through the first hoop by fish to the interior, the door configured to swing into an open position and deform the first end wall, the door configured to provide greater access to the interior when in the open position than the access provided to the interior by the first hoop.

12. The fish trap of claim 11, further comprising:
a support line coupled to each end of the helical spring, lengthwise, extending from one end of the spring to the other end of the helical spring.

13. The fish trap of claim 12, further comprising:
a separate support wire coupled to the helical spring at each end, the support wires at each end extending along the helical spring for less than half the circumference of the column, the support wires configured to provide strength and rigidity to the helical spring during retrieval of the fish trap.

14. The fish trap of claim 12, wherein the support line is coupled to the helical spring on a side opposite the support wires, the support line running in approximately a straight line and further coupled to the helical spring where the support line crosses the helical spring.

15. The fish trap of claim 11, wherein the net has an overall width greater than the circumference of the helical spring such that the net overlaps itself along the length of the helical spring by at least one square of netting, forming a double seam, the net coupled to itself along each end of the overlap.

16. The fish trap of claim 11, further configured to have a collapsed state, the fish trap in the collapsed state having a cross-sectional area of less than one quarter the cross-sectional area of the fish trap while in the expanded state.

17. The fish trap of claim 11, wherein the net is coupled to the helical spring only at the ends of the helical spring, lengthwise, the net and the helical spring free from one another between the first end wall and the second end wall.

18. A fish trap comprising:
a helical spring with a thickness greater than or equal to 6 mm, configured to have an expanded state, the spring in the expanded state having the approximate shape of a column with a diameter greater than 50 cm and a length greater than 100 cm;
a net coupled to the spring forming a side wall for the approximately shaped column, a first end wall and a second end wall at the two opposite ends of the helical spring, lengthwise, each of the first end wall and the second end wall having a web, the helical spring having an interior defined by the bounds of the net and the web at each of the first and second end walls;
a first hoop in the first end wall coupled to the web in the first end wall and creating a first entrance, the first hoop having a diameter less than the diameter of the column, the first hoop configured to allow fish to access the interior of the fish trap;
a first support wire coupled to the helical spring at the first end wall, the first support wire extending along the helical spring for less than half the circumference of the column; and
a second support wire coupled to the helical spring at the second end wall, the second support wire extending along the helical spring for less than half the circumference of the column.

19. A fish trap comprising:
a helical spring with a thickness greater than or equal to 6 mm, configured to have an expanded state, the spring in the expanded state having the approximate shape of a column with a diameter greater than 50 cm and a length greater than 100 cm;
a net coupled to the spring forming a side wall for the approximately shaped column, a first end wall and a second end wall at the two opposite ends of the helical spring, lengthwise, each of the first end wall and the second end wall having a web, the helical spring having an interior defined by the bounds of the net and the web at each of the first and second end walls;
a first hoop in the first end wall coupled to the web in the first end wall and creating a first entrance, the first hoop having a diameter less than the diameter of the column, the first hoop configured to allow fish to access the interior of the fish trap; and
a support line connected to each end of the helical spring, lengthwise, extending from one end of the spring to the other end of the helical spring, the support line running in approximately a straight line and further coupled to the helical spring where the support line crosses the helical spring.

20. A fish trap comprising:
a helical spring with a thickness greater than or equal to 6 mm, configured to have an expanded state, the spring in the expanded state having the approximate shape of a column with a diameter greater than 50 cm and a length greater than 100 cm;
a net coupled to the spring forming a side wall for the approximately shaped column, the net having an overall width greater than the circumference of the helical spring such that the net overlaps itself along the length of the helical spring by at least one square of netting, forming a double seam, the net coupled to itself along each end of the overlap;
a first end wall and a second end wall at the two opposite ends of the helical spring, lengthwise, each of the first end wall and the second end wall having a web, the helical spring having an interior defined by the bounds of the net and the web at each of the first and second end walls; and a first hoop in the first end wall coupled to the web in the first end wall and creating a first entrance, the first hoop having a diameter less than the diameter of the column, the first hoop configured to allow fish to access the interior of the fish trap.

* * * * *

UNITED STATES PATENT AND TRADEMARK OFFICE
CERTIFICATE OF CORRECTION

PATENT NO. : 11,311,004 B2  
APPLICATION NO. : 17/408395  
DATED : April 26, 2022  
INVENTOR(S) : Alexander Stubbs Page 1 of 1

It is certified that error appears in the above-identified patent and that said Letters Patent is hereby corrected as shown below:

In the Claims

Claim 14, Column 13, Line 49 delete "12" and substitute therefore --13--.

Signed and Sealed this
Twenty-sixth Day of September, 2023

Katherine Kelly Vidal
*Director of the United States Patent and Trademark Office*